United States Patent [19]

Ohkuni et al.

[11] Patent Number: 4,589,461
[45] Date of Patent: May 20, 1986

[54] PNEUMATIC BELTED TIRES

[75] Inventors: Shinichiro Ohkuni, Akishima; Yoichi Kitazawa, Higashiyamato, both of Japan

[73] Assignee: Bridgestone Corporation, Tokyo, Japan

[21] Appl. No.: 625,080

[22] Filed: Jun. 27, 1984

[30] Foreign Application Priority Data

Jul. 19, 1983 [JP] Japan ............................. 58-130242

[51] Int. Cl.$^4$ ..................... B60C 9/20; B60C 9/28; B60C 11/06
[52] U.S. Cl. ..................... 152/209 R; 152/209 NT; 152/527; 152/538
[58] Field of Search ........... 152/209 R, 209 A, 209 B, 152/209 NT, 209 WT, 526, 527, 538

[56] References Cited

U.S. PATENT DOCUMENTS 4,364,426 12/1982 Mills et al. ............... 152/209 R
4,388,960 6/1983 Wada et al. ............... 152/209 R
4,390,052 6/1983 Mendiola et al. ............ 152/356

FOREIGN PATENT DOCUMENTS 1222759 2/1971 United Kingdom ............ 152/356

Primary Examiner—Lois E. Boland
Attorney, Agent, or Firm—Sughrue, Mion, Zinn, Macpeak, and Seas

[57] ABSTRACT

A pneumatic belted tire for use in motorcycles is disclosed, which comprises a toroidal carcass, a tread superimposed about a crown region of the carcass at a width corresponding to the maximum width of the carcass and provided on its surface with a tread pattern, and a belt arranged on the crown region over the width of the tread and composed of plural rubberized layers each containing inextensible cords inclined at an angle of not less than 30° with respect to the equatorial plane. In this type of the tire, the inclination angle of cords in the belt gradually enlarges within a range of 7°–20° from the center of the crown region toward the tread side edge, and the tread is provided on each side edge portion with a substantially continuous rib having a width corresponding to 5–25% of the tread width.

5 Claims, 3 Drawing Figures

PNEUMATIC BELTED TIRES

BACKGROUND OF THE INVENTION

1. Field of the Invention

This invention relates to a pneumatic belted tire provided with a belt reinforcement serving to reinforce a tread on a crown region of a carcass, and more particularly to an improvement of a pneumatic belted tire for use in motorcycles.

2. Description of the Prior Art

In general, a pneumatic belted tire of this type mainly comprises a toroidal carcass of radial or semi-radial structure composed of one or few rubberized plies containing cords arranged in a direction perpendicular to the equator of the tire, i.e. a plane including a mid-circumference of a crown region of the carcass or at a certain inclination angle close to the above direction, and a belt superimposed about the crown region of the carcass and composed of two or more rubberized layers each containing inextensible cords such as steel cords or the like arranged at a small angle of not more than 30° with respect to the plane including the equator of the tire, the cords of which being crossed with each other. Moreover, tires having the same belt structure as described above even when the carcass has a so-called bias structure may be included in the belted tire.

These belted tires have hitherto been developed for exclusive use in four-wheeled vehicles and restricted to the applications for such vehicles. In this connection, the equatorial plane of the tire is always held at a substantially vertical state with respect to the ground surface while running, so that the tire tread always comes into contact with ground over its whole width. Hence the belt is located in parallel with the ground contact surface over its width. As a result, the belt having a remarkably high rigidity is located just above the ground contact area over the entire circumference of the tire, so that the belted tires are particularly superior in the cornering stability, wear resistance and so on. It is widely known that the radial tires exhibit a good ride comfortability owing to the peculiar cord arrangement in the carcass ply. Therefore, almost all bias tires widely used have been replaced by the radial tire at present.

On the contrary, when a motorcycle is subjected to a cornering (or a turning movement) in the running, a unique operation mainly depending upon a so-called camber thrust is added, which is entirely different from the case for the four-wheeled vehicle. Moreover, the camber thrust acts as a centripetal force to the ground contact surface of each of front- and rear-wheeled tires, which is opposed to a centrifugal force produced in a body of the motorcycle when the motorcycle body is inclined toward the cornering side in the cornering.

If the radial-structure tire for use in the four-wheeled vehicle is applied to the motorcycle, the camber thrust is very small as compared with the bias-structure tire because the sidewall is extremely flexible. Particularly, when the motorcycle body or the tire is inclined in the cornering, the camber thrust to be produced in accordance with a camber angle or an inclination angle of the equatorial plane of the tire with respect to a vertical line drawn from the road surface cannot smoothly be produced because the difference in the rigidity between the tread reinforced with the belt and the sidewall is excessive. Therefore, there is taken no notice of applying the conventional radial-structure tire to the motorcycle up to now.

The inventors have found that the belted tire can effectively be adapted to the application for motorcycles by reinforcing a predetermined region of the sidewall and a crown region of the carcass with well-known means such as hard rubber and/or cord layer, respectively, and further adopting a proper means for the prevention of cracks, which are apt to occur in groove bottom of a pattern formed on the tread surface due to the specific cord pass of the belt based on the fact that the tread in the motorcycle tire originally reaches near to the position of the maximum width of the crown region, to the belt superimposed about the crown region.

SUMMARY OF THE INVENTION

It is, therefore, an object of the invention to establish the application of pneumatic belted tires to motorcycles and to provide good properties inherent to this type of the tire such as wear resistance, ride comfortability and the like in the application for the motorcycle without reducing tire durability.

According to the invention, there is the provision of a pneumatic belted tire for use in motorcycles comprising a toroidal carcass, a tread superimposed about a crown region of the carcass along the sectional contour thereof so as to extend near the positions corresponding to the maximum width of the carcass and provided on its outer surface with a tread pattern, and a belt arranged along the sectional contour of the crown region substantially over the width of the tread and composed of plural rubberized layers each containing inextensible cords arranged at an inclination angle of not more than 30° with respect to a plane inclusive of the mid-circumference of the crown region, the cords of which layers being crossed with each other;

said belt having such a cord pass that said inclination angle of the cord in the belt enlarges within a range of 7°–20° from the center of the crown region toward the side edge of the tread; and said tread being provided on each side edge portion with a rib substantially continuously extending over the whole circumference of the tread and having a width corresponding to 5–25% of the tread width.

In the embodiment of the invention, the rib may be apparently discontinued over the whole circumference of the tread through transverse grooves each having a depth fairly shallower than the depth of the groove defined by the tread surface pattern or slant grooves each arranged at an inclination angle of not more than 40° with respect to the equatorial plane of the tire and having a depth of up to the groove depth in the tread surface pattern.

According to the invention, the pneumatic belted tire is applied to each of front and rear wheels of the motorcycle, or in some cases it is preferably applied to the rear wheel of the motorcycle together with the usual bias tire mounted on the front wheel. When the belted tire is run under loading, a tendency exists to expand the circumferential length of the tread and is produced as a deformation at the ground contact area, resulting in the pantographic movement forcing the reduction of the cord crossing angle of the belt across the equatorial plane of the tire. As a result, tensile stress against the adhesion to rubber produces in free end of each cord of the belt. If the bottom of the groove in the tread surface pattern is located on the above free end, there is a problem of causing groove bottom cracking. However, according to the invention, the presence of the rib formed on each side edge portion of the tread effectively serves to avoid the occurrence of groove bottom cracking.

BRIEF DESCRIPTION OF THE DRAWING

The invention will be described with reference to the accompanying drawing, wherein.

DETAILED DESCRIPTION OF THE INVENTION

Figure 1:
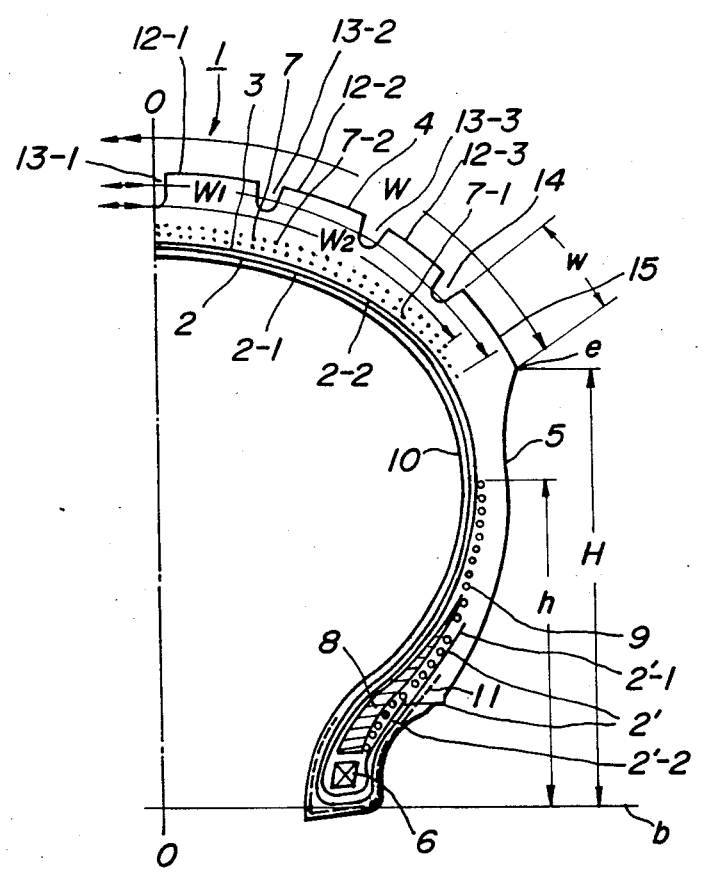
FIG. 1 is a schematically right-half section of an embodiment of the pneumatic belted tire according to the invention.
Figure 2:
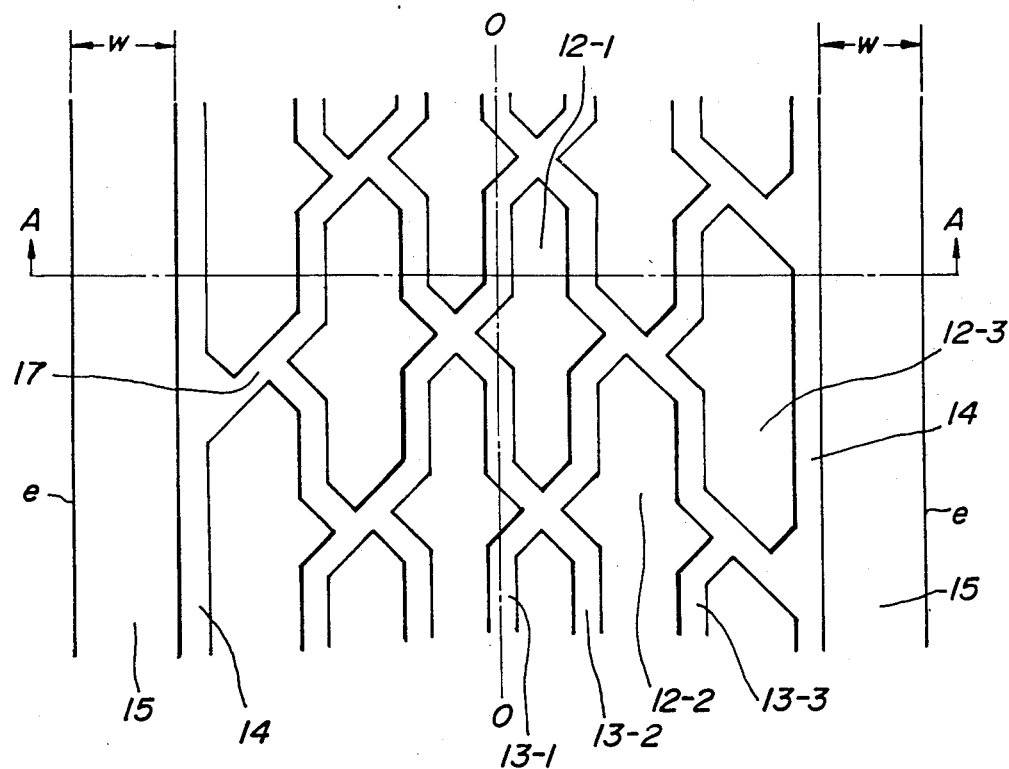
FIGS. 2 and 3 are partial developed views of the tread pattern according to the invention, respectively.
Figure 3:
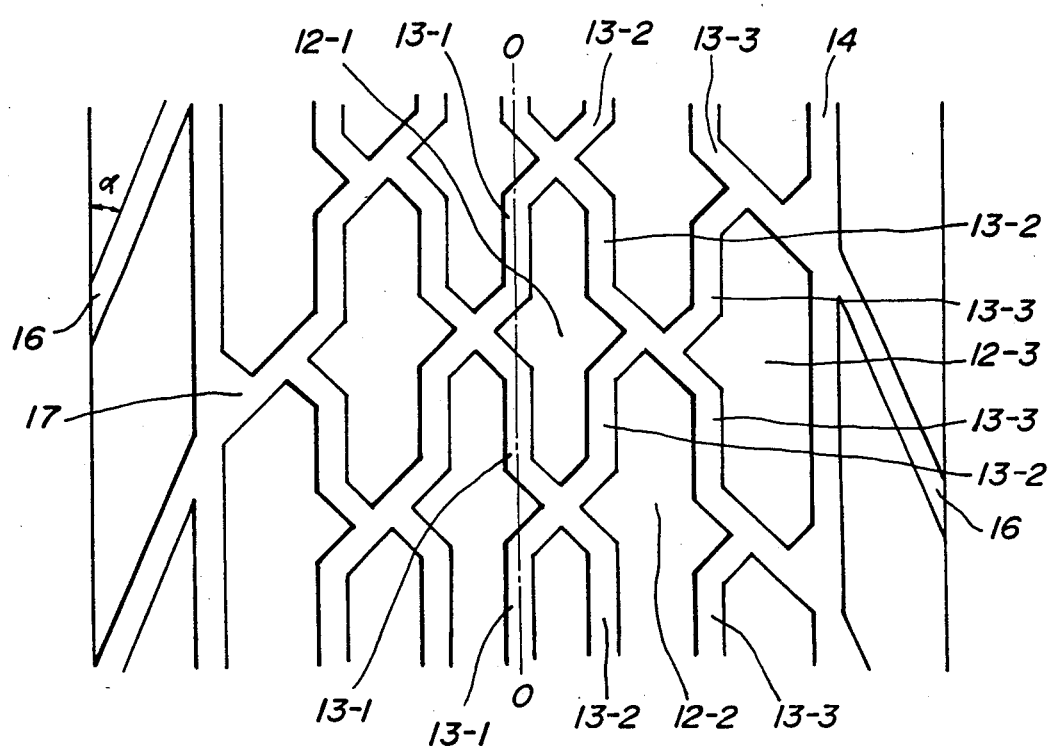

In FIG. 1 is sectionally shown an embodiment of the pneumatic belted tire according to the invention, while FIGS. 2 and 3 illustrate a developed main part of the tread, respectively. Moreover, the left-half section omitted in FIG. 1 is symmetrical with the righ-half section shown in FIG. 1 with respect to the equatorial plane O-O, while the tread pattern unit included in FIG. 2 or 3 is repeated by variable pitch in accordance with custom over the whole circumference of the tread.

As shown in FIG. 1, the tire 1 comprises a toroidal carcass 2, a tread 4 superimposed about a crown region 3 of the carcass along the sectional contour thereof so as to extend near the positions corresponding to the maximum width of the carcass 2, and a sidewall 5 extending inward from each end of the tread 4 in the radial direction of the tire.

The carcass 2 is composed of one or more rubberized plies (2 plies in the illustrated embodiment) containing fiber cords each made, for example, of nylong fiber, polyester fiber, rayon fiber, aramide fiber or the like and arranged at an inclination angle of 50°-90°, preferably 65°-90° at least in the vicinity of the equatorial plane O-O with respect thereto. Both end portions of the carcass 2 are wound around bead rings 6, each embedded in the radially inner edge of the sidewall 5 from inside toward outside in a direction of rotational axis of the tire 1 to form turnups 2'. In the illustrated carcass 2, the turnups 2'-1 and 2'-2 of the plies 2-1 and 2-2 are terminated in the radially inner region of the sidewall 5 at a proper difference in level. Besides this, the turnup 2' of the carcass 2 may be extended within a belt 7 as mentioned later to interpose the end of the turnup 2' between the carcass 2 and the belt 7 or between the ply layers 7-1 and 7-2 of the belt 7 or between the belt 7 and the tread 4, which can serve to enhance the rigidity of the sidewall 5.

In any case, when the cord angle in the plies of the carcass 2 is less than 90°, the plies 2-1 and 2-2 are piled one upon the other so that the cords of the ply 2-1 are crossed with those of the ply 2-2 with respect to the equatorial plane O-O. Furthermore, a hard bead filler rubber 8 (having a Shore A hardness of not less than 60°) extending taperingly above the bead ring 6 outward in the radial direction is disposed between the carcass 2 and the turnup 2', and if necessary, one or few cord reinforcing layers containing metal or fiber cords inclined with respect to the cords of the turnup 2' are further arranged inside the turnup 2' or outside the turnup 2' (not shown) or inside and outside the turnup 2' (not shown). The bead filler rubber 8 and cord reinforcing layer 9 also contribute to enhance the rigidity of the sidewall 5.

A radially upper end of at least one of the turnup 2', bead filler rubber 8 and cord reinforcing layer 9 (the cord reinforcing layer 9 in the illustrated embodiment) is extended over a height h corresponding to not less than 60% of a sidewall height H defined by a vertical distance from bead base b to a side edge e of the tread 4, whereby the sidewall 5 is reinforced so as to gradually reduce the bending rigidity of the sidewall 5 from the radially inner region of the sidewall 5 toward the tread 4.

Moreover, numeral 10 is a flex zone of the sidewall 5 formed near the tread as mentioned above, and numeral 11 is a bead chafer made, for example, of a canvas.

As shown in FIGS. 2 and 3, the surface of the tread 4 is divided into blocks 12-1, 12-2 and 12-3 with regularly bent circumferential grooves 13-1, 13-2 and 13-3 to thereby define the tread surface pattern.

The belt 7 serving the reinforcement of the tread 4 as mentioned above is extended over a width substantially equal to the width of the tread 4 along the sectional contour of the crown region 3 of the carcass 2 and preferably composed of plural rubberized layers each containing inextensible cords known as a reinforcement for the belt, such as metal cords or aramide (KEVLAR, trade name) cords. For example, when two ply layers 7-1 and 7-2 are used in the belt 7 as shown in FIG. 1, the cords of the both layers are inclined at an angle of not more than 30° with respect to the equatorial plane O-O of the tire and crossed with each other. Since the belt 7 extends over the entire width of the tread 4 in compliance with a curvature of the tread, which is fairly larger than that of the tire for four-wheeled vehicle, as apparent from FIG. 1, it has such a cord pass that the inclination angle of the cord in the belt gradually enlarges within a range of 7°-20° from the center of the crown region 3 of the carcass 2 toward each side edge e of the tread 4. As to the width of the belt 7 (i.e. length taken along the contour curve), the illustrated embodiment shows the case that the width $W_1$ of the ply layer 7-1 is wider than the width $W_2$ of the ply layer 7-2, but the case of $W_1 < W_2$ may be taken. Furthermore, either or both of $W_1$ and $W_2$ may be made wider than the width W of the tread 4 within limits not object, or the belt may be a so-called fold type belt obtained by folding either side of a wider ply layer at a position near the tread edge.

In the belted tire for use in motorcycles having the above mentioned structure, the weight of the motorcycle body applied to the ground contact area of the tire forcedly brings about the pressurized deformation along the tread contact area. As a result, the increase in the circumferential length of the carcass 2 as is well-known is caused by the reduction of the crossing angle between cords in the belt 7 or a so-called pantographic movement of the belt, whereby a strong tension stress is produced in the tread rubber containing the belt embedded therein at free ends of cords for the belt having a peculiar cord pass inherent to the motorcycle tire as previously mentioned. Consequently, such a tension force is repeatedly produced for each rotation of the tire with the shift of the ground contact area based on the rotation of the tire.

However, the position of core end in the belt 7 is not usually considered in the relation to the position of groove forming the surface pattern of the tread 4, so that if the cord end locates at the bottom of the groove, it is obliged to produce undesirable cracks in the groove bottom.

For this end, as shown in FIGS. 1-3, a shoulder groove 14 separating blocks 12-1, 12-2 and 12-3 as the surface pattern of the tread 4 from the side edge e of the tread 4 is arranged to form a relatively wide rib 15 extending circumferentially over the tread 4 between the shoulder groove 14 and the tread side edge e, at where is located the cord end of the belt. In this case, the width w of the rib 15 is within a range of 5-25% with respect to the tread width W and is substantially continuous over the whole circumference of the tread 4.

The working "substantially continuous" used herein includes a case that the rib 15 is apparently discontinued by transverse grooves each having a depth fairly shallower than that of the groove defining the surface pattern or by slant grooves each arranged at an inclination angle ($\alpha$) of not more than 40°, preferably 25°-35° with respect to the equatorial plane of the tire and being not so shallow in the groove depth under such a condition that the rubber thickness in the rib 15 can absorb the tensile stress at the cord end of the belt 7 because this case also fulfils the expected effect of the rib 15. In FIG. 3 is illustrated the arrangement of the slant groove 16.

Moreover, the groove depth, is generally represented by a value determined by substracting a skid base guage between the belt 7 and the groove bottom from the thickness Of the tread rubber. For example, the transverse groove may be made shallow so that the skid base gauge under the groove bottom of the transverse groove corresponds to about 2 times of a skid base gauge under the groove bottoms of the circumferential grooves 13-1, 13-2 and 13-3.

In FIGS. 2 and 3, numeral 17 is an auxiliary slant groove communicating the shoulder groove 14 with the circumferential groove 13-3.

In order to confirm the performance of the belted tire for motorcycles having the above mentioned structure, comparison test was made under the following conditions using front-wheel tire of 100/90 R 19 and rear-wheel tire of 120/90 R 18. In this test, a 750 cc motorcycle was run on a circuit course of 4.3 km by an expert rider under substantially the same running conditions.

In the belted tire to be tested, the carcass 2 was composed of two rubberized plies 2-1 and 2-2 each containing polyester cords of 1500 d/2 arranged at an end count of 20 cords/25 mm and at an inclination angle of 75° with respect to the equatorial plane O-O as shown in FIG. 1, the cords of which plies being crossed with each other, wherein the end of the turnup 2'-1 was inserted between the carcass 2 and the side end portion of the belt 7 and the turnup 2'-2 was terminated at a position corresponding to 50% of the sidewall height H. As shown in FIG. 1, the bead filler rubber 8 having a Shore A hardness of 75° was disposed between the carcass 2 and the turnup 2'-1 over a region extending from above the bead ring 6 to a position corresponding to 75% of the sidewall height H, while the cord reinforcing layer 9 containing polyester cords of 1500 d/2 therein was disposed to extend to a position corresponding to 65% of the sidewall height H.

Concerning the tread 4, the surface pattern shown in FIG. 2 was applied to the test tire according to the invention, while the test tire for control had the same surface pattern as in FIG. 2 except that the rib 17 had a row of blocks substantially same to the block 12-3. In any case, ratios of rib and block to the tread width W were 15%, respectively.

In these two tires, the belt 7 was composed of two ply layers each containing aramide cords of 1500 d/2 arranged at an end count of 19.5 cords/25 mm and at an inclination angle of 22° with respect to the equatorial plane O-O, the cords of which layers being crossed with each other, wherein the cord angle at cord end of the belt 7 located in the rib 15 or the corresponding block was enlarged to 37°.

In the test tire, the internal pressure was 2.0 kg/cm$^2$ for front wheel and 2.25 kg/cm$^2$ for rear wheel, respectively. Then, the stability in straight running within a range of from low speed to 200 km/hr (maximum speed) was evaluated by the presence of wobbling or the occurrence of coupled vibration mode in yaw.roll directions of front and rear wheels. Further, the cornering stability was evaluated in the running on a circuit course consisting of a combination of various corners having a radius of 30-300 m. Finally, the test tire was run on a general-purpose road at a speed of 40-100 km/hr until the tire was completely worn, and thereafter the presence of cracks in the groove bottom was examined. The test results are shown in the following table.

|  | Control tire | Invention tire |
| --- | --- | --- |
| Straight running stability | good | good |
| Cornering stability | slightly poor | good |
| Occurrence of cracks | many cracks occurred in the bottom of the grooves surrounding the shoulder block | no |

As previously mentioned, according to the invention, the application of pneumatic belted tire for motorcycles can advantageously be enlarged because there can effectively be prevented the occurrence of cracks in the groove bottom, which has been brought depending upon the arrangement of the tread surface pattern under the specific of the tread sectional shape by the cord pass of the belt for the reinforcement of the tread in the conventional countermeasure for applying the pneumatic belted tire to the motorcycle.

What is claimed is:

1. A pneumatic belted tire for use in motorcycles comprising a toroidal carcass composed of at least one rubberized ply containing fiber cords arranged at an inclination angle of 50°-90° with respect to the equatorial plane of the tire, a tread superimposed about a crown region of the carcass along the sectional contour thereof so as to extend near the positions corresponding to the maximum width of the carcass and provided on its outer surface with a tread pattern including a circumferential groove continuously extending at each shoulder portion of the tread and a substantially continuous rib defined between the circumferential groove and the tread edge, and a belt arranged along the sectional contour of the crown region between the carcass and the tread and composed of plural rubberized layers each containing inextensible cords arranged at an inclination angle of not more than 30° with respect to the equatorial plane of the tire, the cords of which layers being crossed with each other;

said belt having such a cord pass that said inclination angle of the cord in the belt enlarges within a range of 7°-20° from the center of the crown region toward the side edge of the tread; and said rib in the tread having a width corresponding to 5-25% of the tread width; and each of lateral edges of said belt being located at a position corresponding to right underside of the circumferential rib.

2. The pneumatic belted tire according to claim 1, wherein said rib is apparently discontinued over its whole circumference by slant grooves each arranged at an inclination angle of not more than 40° with respect to the equatorial plane of the tire and having a depth equal to or smaller than a depth of grooves defining the tread surface pattern.

3. The pneumatic belted tire according to claim 2, wherein a skid base gauge under groove bottoms of said slant grooves corresponds to about two times of a skid base gauge under groove bottoms of the other grooves.

4. The pneumatic belted tire according to claim 1, wherein said inextensible cord for the belt is an aramide cord.

5. A pneumatic belted tire for use in motorcycles comprising a toroidal carcass composed of at least one rubberized ply containing fiber cords arranged at an inclination angle of 50°–90° with respect to the equatorial plane of the tire, a tread superimposed about a crown region of the carcass along the sectional contour thereof so as to extend near the positions corresponding to the maximum width of the carcass and provided on its outer surface with a tread pattern including a circumferential groove continuously extending at each shoulder portion of the tread, a substantially continuous rib defined between the circumferential groove and the tread edge and plural rows of blocks defined in the remaining portion of the tread other than said continuous ribs, and a belt arranged along the sectional contour of the crown region between the carcass and the tread and composed of plural rubberized layers each containing inextensible cords arranged at an inclination angle of not more than 30° with respect to the equatorial plane of the tire, the cords of which layers being crossed with each other;

said belt having such a cord pass that said inclination angle of the cord in the belt enlarges within a range of 7°–20° from the center of the crown region toward the side edge of the tread; and said rib in the tread having a width corresponding to 5–25% of the tread width; and each of lateral edges of said belt being located at a position corresponding to right underside of the circumferential rib.

* * * * *